United States Patent [19]
Tanaka

[11] Patent Number: 5,867,330
[45] Date of Patent: *Feb. 2, 1999

[54] REPRODUCING APPARATUS DETECTING PILOT SIGNALS BY BINARY DATA PROCESSING

[75] Inventor: Yasuyuki Tanaka, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 551,336

[22] Filed: Nov. 1, 1995

[30]   Foreign Application Priority Data

Nov. 11, 1994   [JP]   Japan ..................................... 6-277832

[51] Int. Cl.⁶ ...................................................... G11B 5/09
[52] U.S. Cl. ..................... 360/32; 360/77.14; 360/73.12; 341/155

[58] Field of Search ..................................... 360/77.14, 32, 360/51, 73.12; 341/55, 110, 155, 158

[56]   References Cited

U.S. PATENT DOCUMENTS

| | | | |
|---|---|---|---|
| 4,812,987 | 3/1989 | Yamawaki et al. | 360/32 X |
| 4,831,464 | 5/1989 | Chijiiwa | 360/32 |
| 5,258,877 | 11/1993 | Leake et al. | 360/51 |
| 5,359,473 | 10/1994 | Kaniwa et al. | 360/77.14 |

*Primary Examiner*—Alan Faber
*Attorney, Agent, or Firm*—Robin, Blecker & Daley

[57]   ABSTRACT

A digital signal reproducing apparatus includes a reproducing circuit for reproducing from a recording medium a signal, whose amplitude takes on plural values, and which was recorded on the medium by digital modulation of a pilot signal component with digital data, a forming circuit for forming binary data indicative of the plural amplitude values, and a detecting circuit realized by binary data processing circuitry and detecting the pilot signal component on the basis of the binary data.

22 Claims, 12 Drawing Sheets

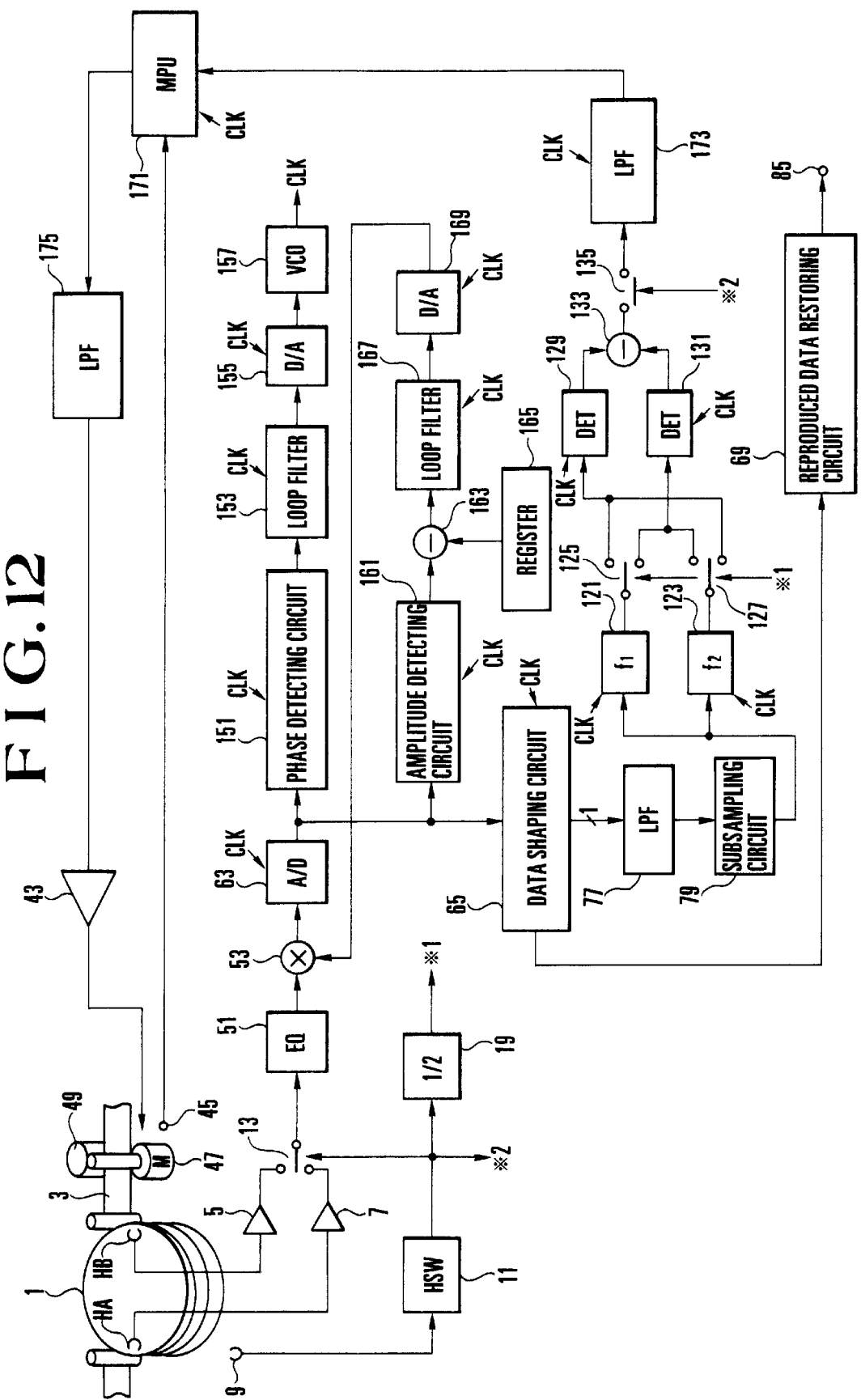

REPRODUCING APPARATUS DETECTING PILOT SIGNALS BY BINARY DATA PROCESSING

BACKGROUND OF THE INVENTION

1. Field of the Invention

The present invention relates to a digital signal reproducing apparatus and, more particularly, to an apparatus for detecting a predetermined pilot signal component from a reproduced signal.

2. Description of the Related Art

In recent years, with the advance of magnetic recording/reproduction technology, magnetic recording media and the like, it has become possible to record a large amount of digital information on a small-size magnetic tape or magnetic disk. The pitch of recording tracks on a recording medium has been becoming smaller and smaller for the purpose of higher-density recording, and the art of enabling a reproducing head to accurately trace such small-pitch tracks, i.e., tracking control, is an important technical subject to be considered in the field of digital signal reproducing apparatus.

An art for achieving such tracking control has been proposed. In the art, digital modulation is applied to multiplex a pilot signal component for tracking control with a digital signal to be recorded on a track, i.e., a redundancy bit is assigned to each digital data to be recorded and the redundancy bit is set to "1" or "0" to multiplex a pilot signal component of predetermined frequency (for example, f1 or f2) with the digital data.

FIG. 1 is a schematic block diagram showing the essential construction of a reproducing circuit for a digital VTR which is arranged to detect a pilot signal component multiplexed with a digital signal and perform tracking control.

As shown in FIG. 1, a magnetic tape 3 is wrapped around a rotary head drum 1 over an angular extent of 180° or more, and the digital data recorded on a multiplicity of tracks formed on the magnetic tape 3 are sequentially reproduced by two rotary heads HA and HB which are arranged to rotate with a phase difference of 180°. The outputs of the rotary heads HA and HB are respectively amplified by reproducing amplifiers 5 and 7, and the outputs of the reproducing amplifiers 5 and 7 are inputted to a switch 13.

The rotational phase of the rotary head drum 1 is detected by a PG head 9, and a head switching circuit (HSW circuit) 11 forms a head switching pulse (HSW) according to a detection signal (PG) indicative of the detected rotational phase. FIG. 2 is a schematic view showing a recording pattern which is formed on the magnetic tape 3, and FIG. 3 is a timing chart showing waveforms which are obtained at essential locations in the circuit shown in FIG. 1. As shown in FIG. 3, the HSW having a rectangular waveform is obtained from the HSW circuit 11.

The switch 13 operates according to the HSW, and supplies the output of the rotary head HA or HB which is tracing the magnetic tape 3 to the circuits provided at the next stage.

The signal outputted from the switch 13 has the envelope waveform shown in FIG. 3 and contains the shown pilot signal components. In FIG. 2, each track marked with f1 or f2 indicates that the pilot signal component having the predetermined frequency f1 or f2 is multiplexed with the track, and each track marked with f0 indicates that neither of the pilot signal components f1 and f2 is multiplexed with the track and the pilot signal components f1 and f2 are attenuated. Accordingly, the pilot signal components mainly contained in the signal outputted from the switch 13 are as shown in FIG. 3.

The output of the switch 13 is supplied to a reproduced signal processing circuit 15, in which the original digital information is detected. The reproduced signal processing circuit 15 performs predetermined processing, such as error correction and data decoding, on the original digital information, to restore the original digital video signal, and outputs the original digital video signal to an output terminal 17 as a reproduced video signal.

The output of the switch 13 is also supplied to band-pass filters (BPFs) 21 and 23, in which the pilot signal components f1 and f2 are detected, respectively. Tracking control is achieved during the reproduction of a digital signal from any of the tracks marked with f0, by making comparison between the pilot signal components f1 and f2 which leak from both adjacent tracks to the digital signal during such reproduction and controlling the amount of transport of the magnetic tape 3 so that the ratio of the pilot signal component f1 to the pilot signal component f2 can be made constant (normally, 1:1).

The pilot signal components f1 and f2 extracted by the BPFs 21 and 23 are respectively inputted to switches 25 and 27. As shown in FIG. 2, the positional relationship between both tracks adjacent to each of the tracks marked with f0 is inverted every other track in such a manner that the pilot signal components f1 and f2 are alternately multiplexed onto every fourth track. Accordingly, each of the switches 25 and 27 is switched at intervals of a two-track period in accordance with the signal obtained by frequency-dividing the HSW in a ½ frequency divider 19, whereby the pilot signal components f1 and f2 which leak to a track (f0) which is being traced from both adjacent tracks are supplied to detecting circuits 29 and 31. The output of the ½ frequency divider 19 is shown in FIG. 3.

The detecting circuits 29 and 31 detect the respective input signals and convert them into the corresponding voltage levels, and supply the voltage levels to a subtracting circuit 33. The subtracting circuit 33 makes comparison between the amounts of leaks from both adjacent tracks and inputs the comparison result to a switch 35 as a tracking error signal. Referring to the opening and closing timing of the switch 35, when the HSW of FIG. 3 is at its high level, the switch 35 is closed since any of the tracks marked with f0 is being traced for reproduction, whereas when the HSW of FIG. 3 is at its low level, since any of the tracks marked with f1 and f2 is being traced for reproduction, the switch 35 is opened to hold the previous voltage level.

The output of the switch 35 is smoothed by a loop filter 37, and the output of the loop filter 37 is inputted to an adding circuit 39 as a tracking error signal. A frequency generator (hereinafter referred to as the FG head) 45, which is attached to a capstan motor 47, outputs a pulse having a frequency proportional to the rotational speed of the capstan motor 47. The frequency signal (capstan FG) outputted from the FG head 45 is inputted to a speed loop servo circuit 41, which forms a speed control signal for adjusting the rotational speed of a capstan to a desired rotational speed.

The adding circuit 39 adds together the tracking error signal and the speed control signal, and applies the sum of these signals to a motor driver 43 as a final control voltage for the capstan motor 47. The capstan motor 47 is driven by the motor driver 43, whereby the magnetic tape 3 is transported in the longitudinal direction so that the rotary heads HA and HB can correctly trace individual tracks on the magnetic tape 3.

However, since the tracking control circuit (ATF circuit) of the above-described example is composed of an analog circuit, the passbands of the respective BPFs 21 and 23 become considerably low and narrow (some tens of kilohertz), so that an increase in the scale of the entire circuit construction is difficult to avoid.

If such an ATF circuit is to be digitized, a digital filter having an enormous number of taps must be constructed because the clock frequency of a digital signal (for example, 41.85 MHz) is considerably distant from the frequencies of the pilot signal components f1 and f2 to be extracted and, in addition, because each of the BPFs 21 and 23 has such a narrow bandwidth.

One approach is to perform subsampling before a digital BPF and lower the clock frequency to a great extent. To realize this approach, it is necessary to insert a prefilter for cutting off aliasing noise before subsampling, i.e., it is necessary to suppress frequency components of $f_s'/2$ or higher ($f_s'$ represents the subsampling frequency). However, if such a pre-filter is provided in this manner, the pre-filter itself needs a considerably large number of taps and the hardware scale becomes large.

SUMMARY OF THE INVENTION

It is, therefore, an object of the present invention to provide a digital signal reproducing apparatus capable of securely extracting a pilot signal component contained in a reproduced signal, without the need for a large circuit scale.

To achieve the above-described object, according to one aspect of the present invention, there is provided a digital signal reproducing apparatus which comprises reproducing means for reproducing a signal indicative of digital information from a recording medium, forming means for forming binary data indicative of a magnitude of an actual reproduced signal relative to a plurality of predetermined values indicative of a plurality of amplitude values to be taken by a reproduced signal supplied from the reproducing means, and detecting means for detecting a pilot signal component multiplexed with the reproduced signal, on the basis of the binary data.

According to the above-described arrangement, a component which is not necessary to detect the pilot signal component can be efficiently eliminated, and since the detection of the pilot signal component is realized by a binary data processing circuit, the circuit scale of the apparatus is remarkably reduced.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 12 is a schematic block diagram showing the construction of a reproducing circuit for a digital VTR which is a second embodiment of the present invention.

DETAILED DESCRIPTION OF THE PREFERRED EMBODIMENTS

Preferred embodiments of the present invention will be described below with reference to the accompanying drawings.

Figure 4:
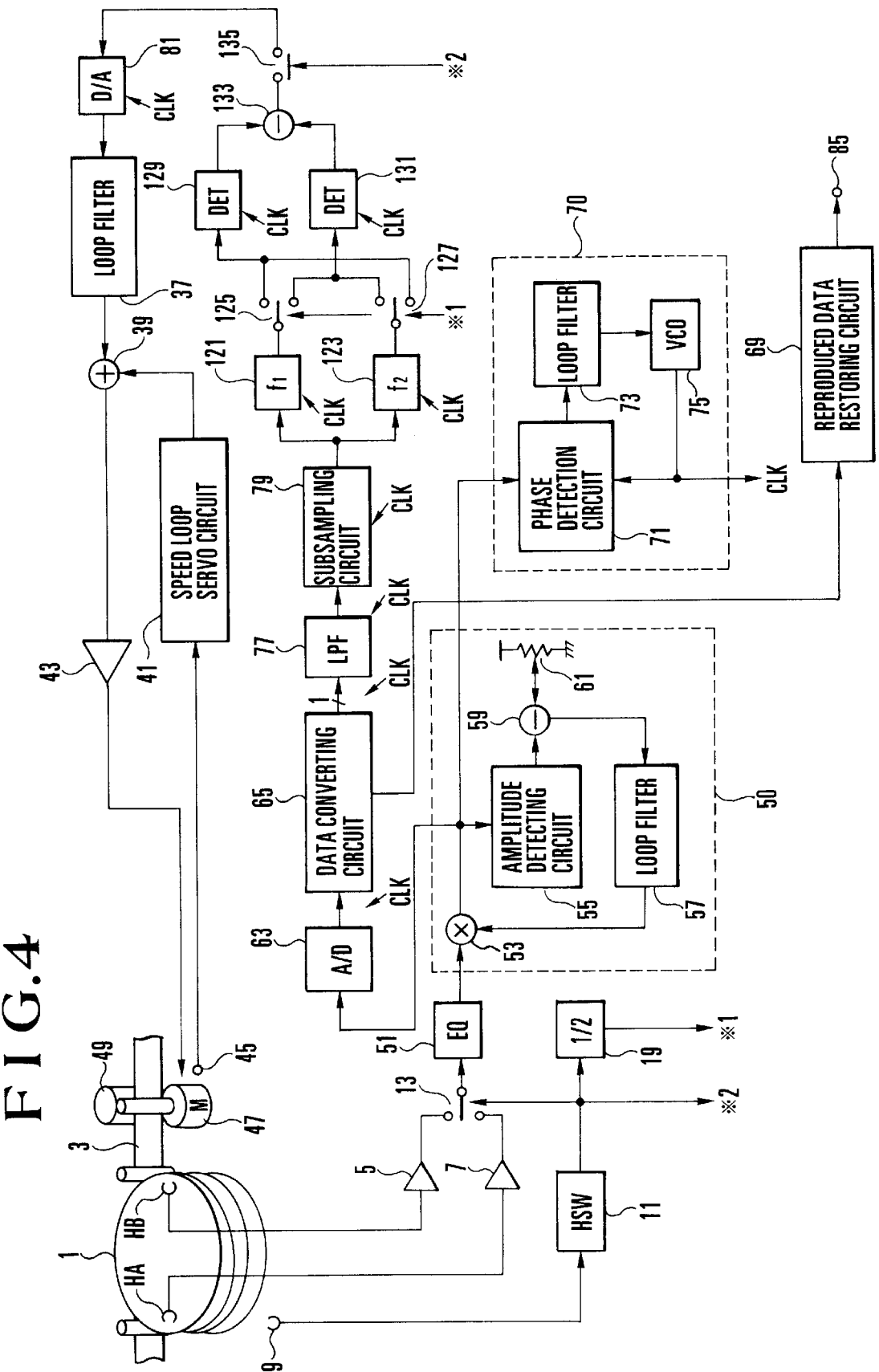
FIG. 4 is a schematic block diagram showing the construction of a reproducing circuit for a digital VTR which is a first embodiment of a digital signal reproducing apparatus according to the present invention.

FIG. 4 is a schematic block diagram showing the essential construction of a reproducing circuit for a digital VTR to which the present invention is applied. In FIG. 4, identical reference numerals are used to denote constituent elements identical to those shown in FIG. 1, and the detailed description thereof is omitted for clarity.

The output of a switch 13, which is arranged to selectively output the signals obtained by amplifying the respective outputs of rotary heads HA and HB, is inputted to an equalizer 51. The equalizer 51 performs so-called integral equalization, i.e., compensates for a low-frequency component which is lost in accordance with the differential characteristics of the ring heads and a high-frequency component which is lost by spacing loss or the like, and inputs the equalized signal to an AGC (automatic gain control) circuit 50 provided at the next stage.

The AGC circuit 50 includes an analog multiplying circuit 53, an amplitude detecting circuit 55, a potentiometer 61, a subtracting circuit 59 and a loop filter 57, and the gain of the analog multiplying circuit 53 is adjusted so that the output of the AGC circuit 50 can be made a target amplitude. The output of the AGC circuit 50 is inputted to a tracking control circuit composed of an A/D converter 63 and the following constituent elements and to a PLL circuit 70.

The PLL circuit 70 includes a phase detecting circuit 71, a loop filter 73 and a voltage-controlled oscillator (VCO) 75. The PLL circuit 70 produces a clock CLK synchronized with the input data signal, by performing feedback control so that the phase of the edge of the input signal and the phase of the edge of the output clock of the VCO 75 can be made constant. The PLL circuit 70 supplies the clock CLK to predetermined parts of a digital ATF circuit which includes the A/D converter 63 to a D/A converter 81.

The digital ATF circuit includes the A/D converter 63, a data converting circuit 65, a low-pass filter (LPF) 77, a subsampling circuit 79, BPFs 121 and 123, switches 125 and 127, digital detecting circuits 129 and 131, a subtracter 133, a switch 135 and the D/A converter 81. The entire digital ATF circuit is formed as a digital circuit and operates in accordance with the clock CLK outputted from the PLL circuit 70.

The reproduced signal, which has been subjected to the aforesaid integral equalization and has an amplitude adjusted to a predetermined amplitude by the AGC circuit 50, is inputted to the A/D converter 63 and converted into a digital value. In this embodiment, a signed 8-bit digital value is outputted from the A/D converter 63. The output of the A/D converter 63 is inputted to the data converting circuit 65.

Figure 5:
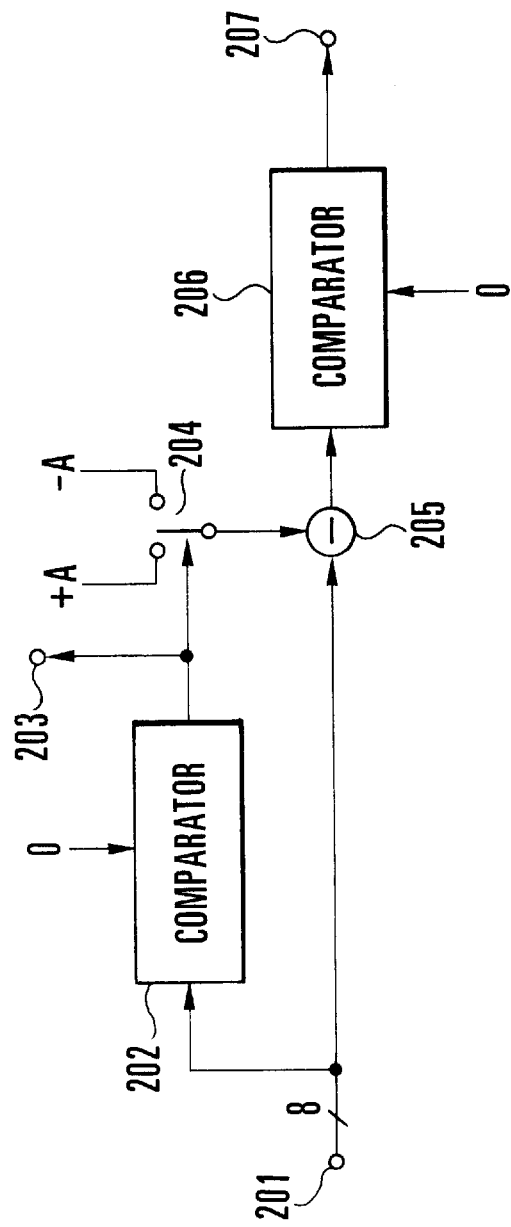
FIG. 5 is a block diagram showing a specific construction of the data converting circuit shown in FIG. 4.

FIG. 5 is a block diagram showing a specific example of the data converting circuit 65 shown in FIG. 4. The signal inputted to the data converting circuit 65 has an amplitude which is controlled by the AGC circuit 50 so that the digital levels "1" and "0" can be set to +A and −A, respectively. These values +A and −A are a plurality of amplitude values either of which is to be taken by the reproduced signal and becomes the value of the target amplitude to be outputted from the AGC circuit 50. The input signal is inputted to a comparator 202 and a subtracter 205 as parallel data.

The comparator 202 detects whether the reproduced data indicates the aforesaid digital level "1" or "0". Specifically, in this embodiment, since the 8-bit parallel data is signed, the comparator 202 detects the most significant bit (MSB) of the 8-bit parallel data. Quantitatively, the comparator 202 compares the input 8-bit data with the value "0" and outputs the result. In actual form, the most significant bit (MSB) is merely extracted.

The output of the comparator 202 is supplied to a terminal 203 and a data selector 204. The 1-bit output from the terminal 203 is inputted to a reproduced data restoring circuit 69 of FIG. 4, in which the original video information is restored. The restored video information is outputted from a terminal 85 as a reproduced video signal.

The data selector 204 selects the value +A if the MSB of the 8-bit data is "1", or the value −A if it is "0". The selected value is inputted to the subtracter 205. The subtracter 205 subtracts the value +A or −A from the input 8-bit data and inputs the resultant value to a comparator 206. The comparator 206 compares the output value of the subtracter 205 with the value "0", and supplies the result to an output terminal 207 as 1-bit binary data. Since the MSB of the output value of the subtracter 205 is compared with the value "0", the comparator 206 can also provide the result by detecting the MSB of the input data.

If the target amplitude value A is set as a power of 2, it is possible to simplify the above-described construction. Specifically, the entire construction shown in FIG. 5 may be arranged to obtain the result merely by extracting a particular bit, or by extracting a particular bit and performing a simple logical operation on it. For example, if the target amplitude value A is selected to be "64", the MSB indicates the digital value and the output of the comparator 206 is placed at the adjacent bit.

The output of the data converting circuit 65 is inputted to the LPF 77. The LPF 77 serves as a pre-filter for enabling rear-stage circuits to operate at a clock frequency reduced to approximately 1/10. The LPF 77 is suitably composed of an up/down counter because the input of LPF 77 is 1-bit data. The output of the LPF 77 is sampled down to approximately 1/10 by the subsampling circuit 79, and the resultant sample is inputted to the BPFs 121 and 123. The BPFs 121 and 123 serve as digital filters for extracting the pilot signal components f1 and f2, respectively.

Each of the BPFs 121 and 123 may have an FIR (finite impulse response) or IIR (infinite impulse response) construction. In either construction, if an equal bandwidth centered about each of the frequencies f1 (for example, 465 kHz) and f2 (for example, 697.5 kHz) is to be extracted, it is preferable to avoid the use of a clock frequency which is scores of times as high as the frequencies f1 and f2, because the circuit scales of the BPFs 121 and 123 can be made small. Specifically, if a clock frequency for the original reproduced data is 41.85 MHz, it is possible to greatly reduce the circuit scales of the BPFs 121 and 123 by driving them by using not such a clock frequency but a clock frequency of 4.185 MHz.

According to the above-described arrangement and construction, it is possible to greatly reduce the required amount of hardware because a data converting circuit, such as a simple logic circuit, is provided for shaping input data into 1-bit data and a subsampling pre-filter having a 1-bit input and hence a simple counter arrangement is provided, as well as because a 1-bit-input BPF having a far simpler construction can be used because of a lowering in clock frequency.

Figure 6:
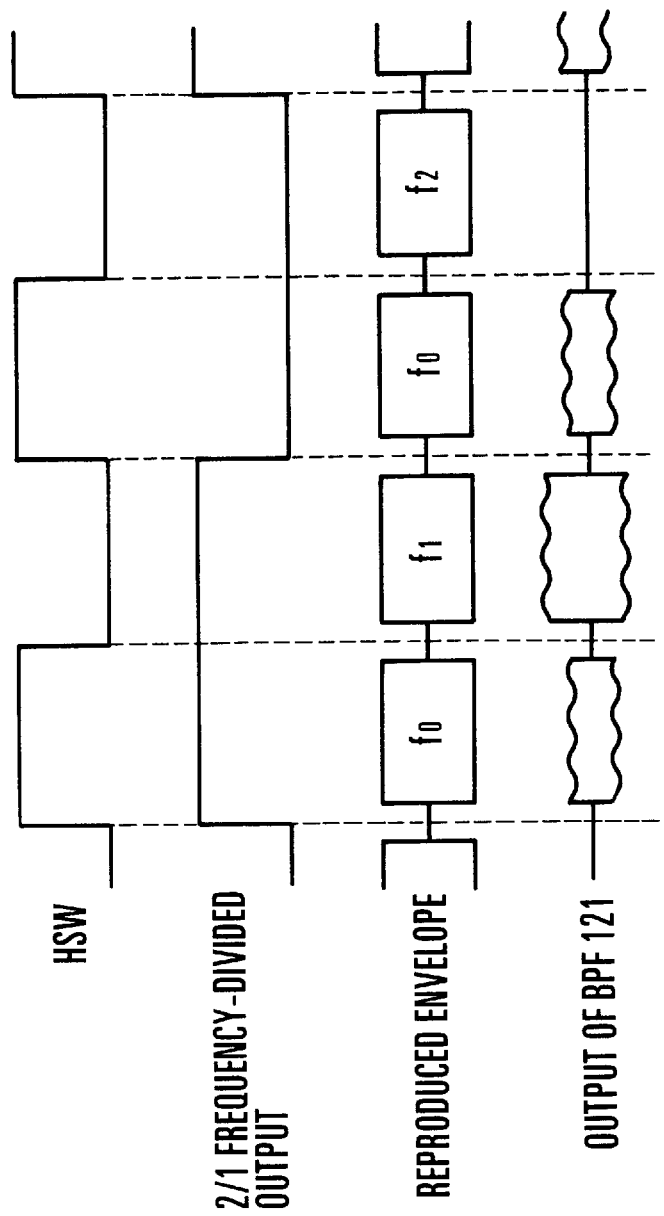
FIG. 6 is a timing chart showing waveforms which are obtained at essential locations in the circuit shown in FIG. 4.

FIG. 6 is a timing chart showing waveforms which are obtained at essential locations in the circuit shown in FIG. 4. The envelope outputted from the BPF 121 is as shown in FIG. 6. The outputs of the BPFs 121 and 123 are respectively switched by the switches 125 and 127 every other track, so that the outputs of the BPFs 121 and 123 are alternately supplied to the digital detecting circuits 129 and 131. The digital detecting circuits 129 and 131 detect the input signals and input the detection results to the subtracter 133. The subtracter 133 compares the amounts of leakage of the pilot signal components f1 and f0 from both adjacent tracks, and outputs the difference as a difference signal.

Figure 1:
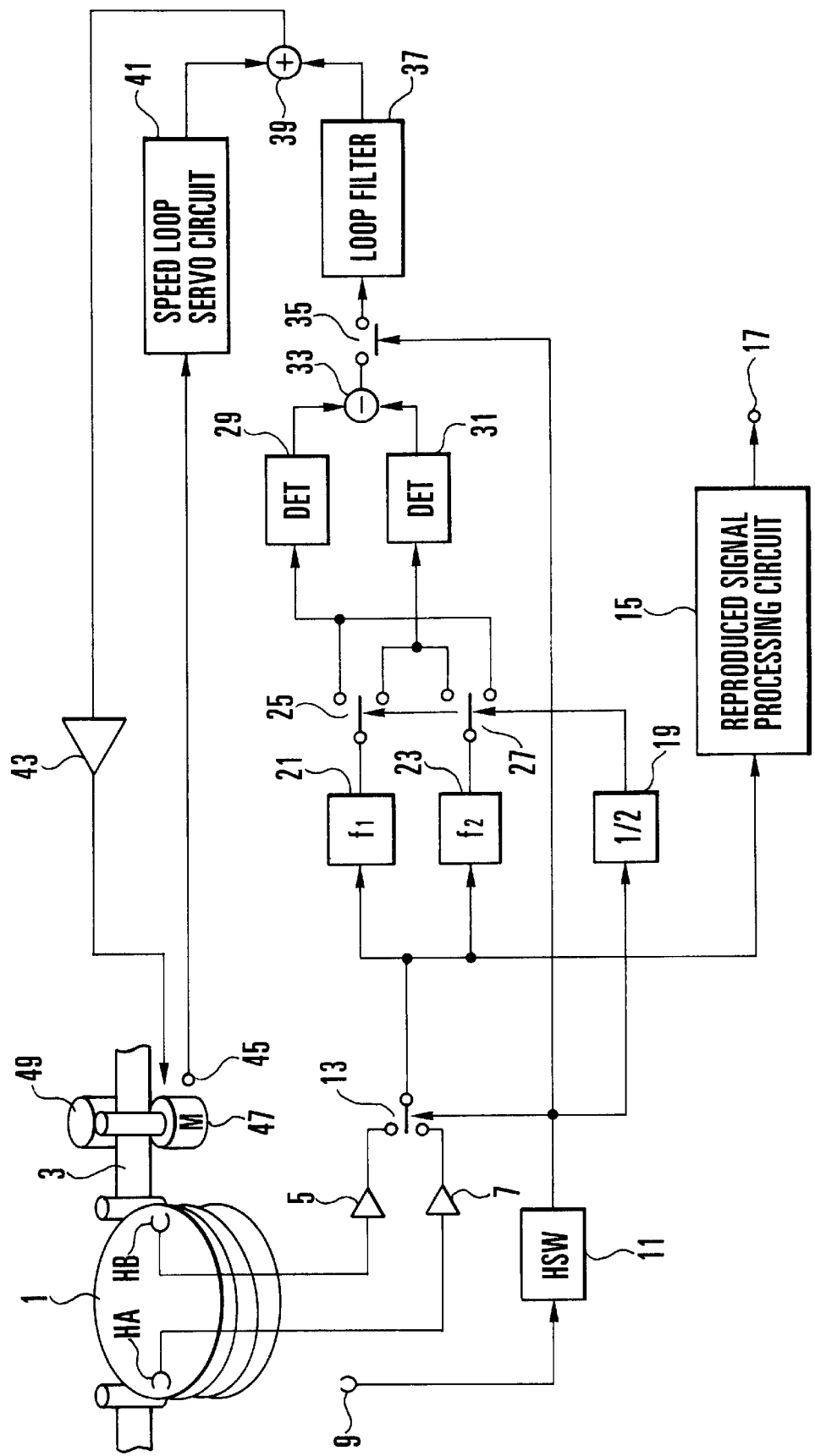
FIG. 1 is a schematic block diagram showing a construction example of a reproducing circuit for a conventional digital VTR.

The opening and closing timing of the switch 135 is determined by an output $\overline{X}2$ of the HSW circuit 11 in a manner similar to that used in the example of FIG. 1. The output of the switch 135 is converted into an analog value by the D/A converter 81, and the analog value is applied to the loop filter 37 as the output of the digital ATF circuit. The loop filter 37 smooths the applied signal and the output of the loop filter 37 is added to a speed control signal in the adding circuit 39, thereby producing a control signal for the capstan motor 47 in a manner similar to that described previously in connection with FIG. 1.

The relationship between the amplitude of a digital reproduced signal which is inputted to the A/D converter 63 and the amount of a pilot signal component which is outputted to the BPF 121 or 123 will be described below with reference to FIG. 7 on the assumption that the equalizing method is integral equalization. For the sake of simplification of explanation, the following description refers to the case of extraction of a bit adjacent to the MSB of 8-bit data inputted to the data converting circuit 65.

Figure 7:
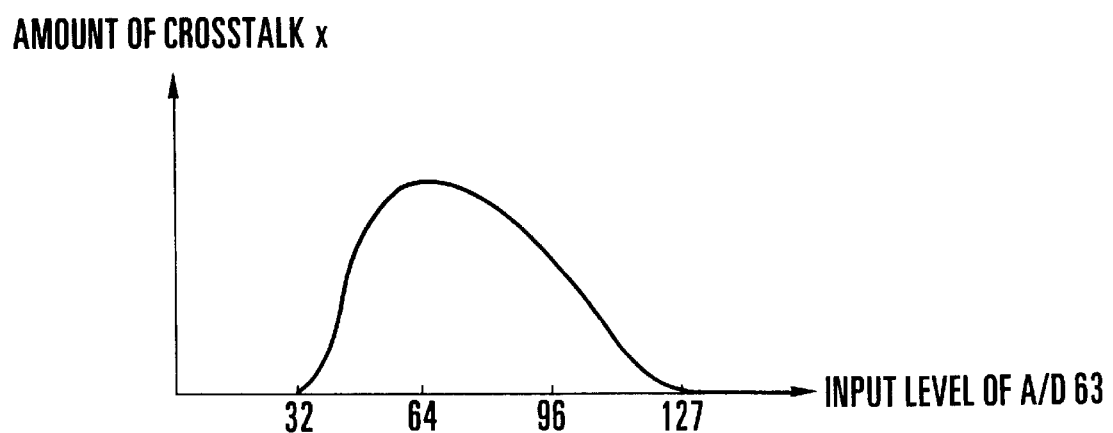
FIG. 7 is a graphic representation showing the relationship between the amplitude of a digital reproduced signal and the amount of a detected pilot signal component.
Figure 8:
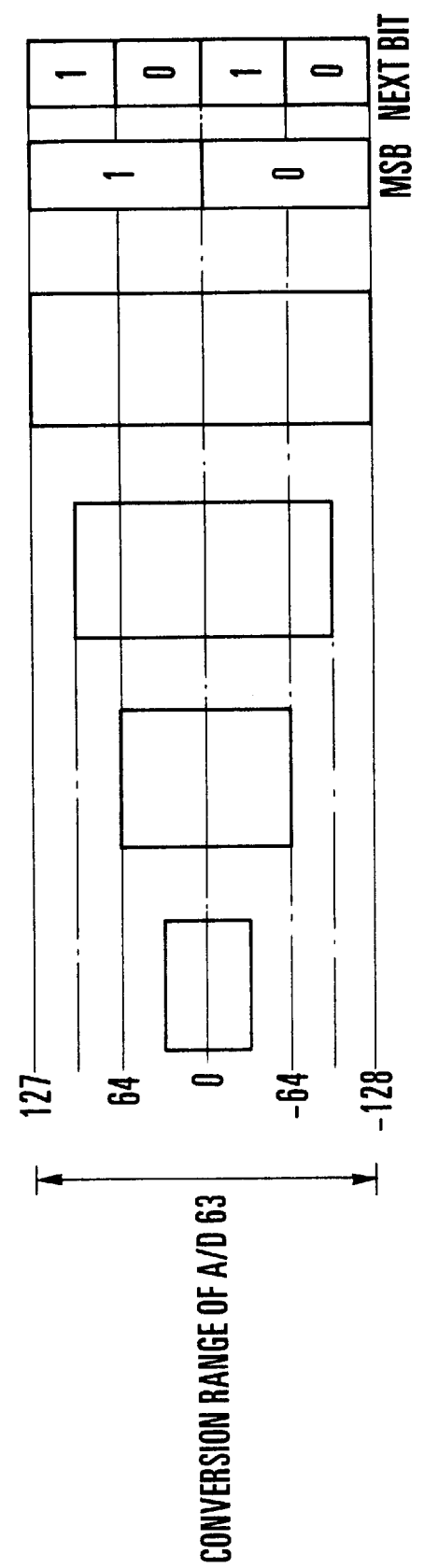
FIG. 8 is a schematic view showing the relationship between the amplitude of the digital reproduced signal and an amplitude A.

In FIG. 7, the horizontal axis represents the amplitude of the digital reproduced signal which is inputted to the A/D converter 63. The relationship between the amplitude of the digital reproduced signal and the amplitude A is shown in FIG. 8. Incidentally, the target amplitude A to be set in the AGC circuit 50 can be arbitrarily determined by using the potentiometer 61. The vertical axis of FIG. 7 represents the amount of crosstalk which is outputted to the BPF 121 or 123 when the state of tracking control is correct.

Figure 9:
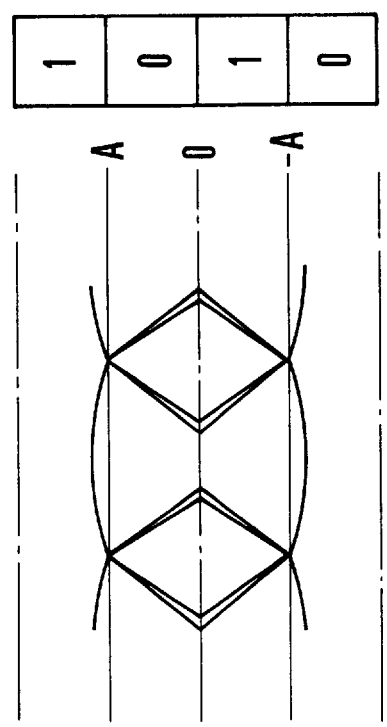
FIG. 9 is a schematic view showing the eye pattern obtained from the detection of reproduced data by the circuit shown in FIG. 5.

As is apparent from FIG. 7, when the target amplitude A is set to "64", the amount of crosstalk is at a maximum. This is because, since the magnitude of data at each detection point thereof is centered about +64 and −64, digital data to be reproduced is centered about the MSB of A/D-converted 8-bit data and crosstalk components derived from the adjacent tracks are dithered by noise or equalization error and multiplexed with the adjacent bit. The eye pattern obtained from the detection of the data reproduced from the adjacent bit is shown in FIG. 9.

Although the above description has referred to the case in which a recorded signal indicates two-level digital data, the concept of the present invention can also be applied to an apparatus for restoring a reproduced signal from digital data represented by three or more levels.

Figure 10:
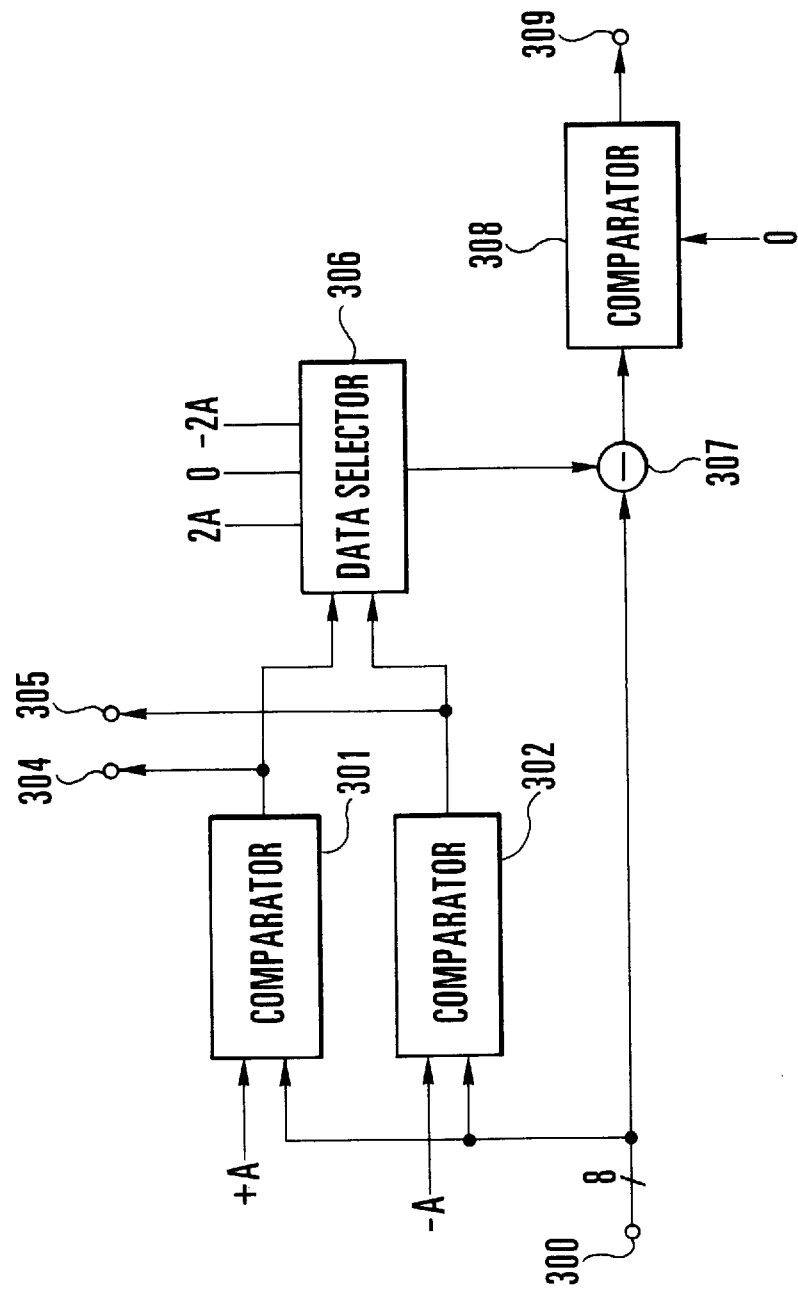
FIG. 10 is a block diagram showing another specific construction of the data converting circuit shown in FIG. 4.
Figure 11:
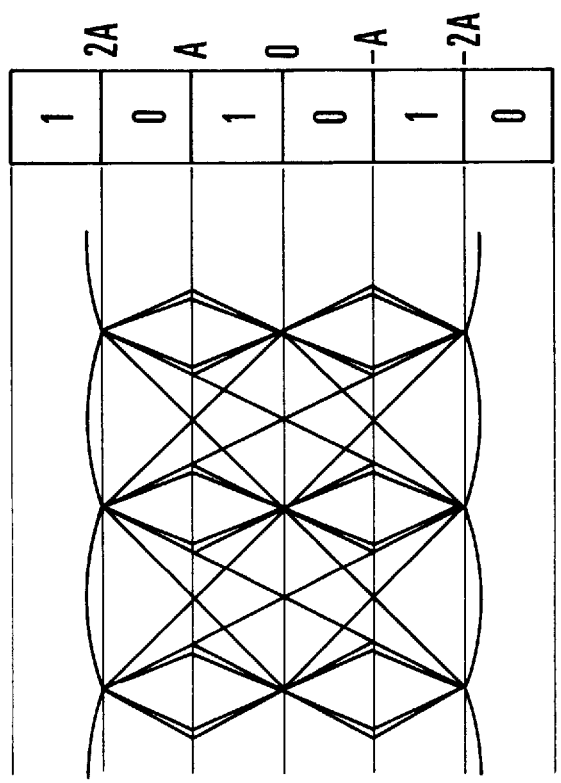
FIG. 11 is a schematic view showing the eye pattern obtained from the detection of reproduced data by the circuit shown in FIG. 10.

FIG. 10 is a block diagram showing a specific example of the data converting circuit 65 of FIG. 4 for handling three-level reproduced data. FIG. 11 shows the eye pattern obtained from the detection of data reproduced from the three-level signal. When three-level equalized digital data is applied to an input terminal 300, the data is compared with the values +A and −A by comparators 301 and 302 which constitute a three-level detector, respectively. The outputs of the comparators 301 and 302 are respectively outputted to terminals 304 and 305 as 2-bit data and supplied to a reproduced data restoring circuit provided at the next stage.

The outputs of the comparators 301 and 302 are also supplied to a data selector 306, and the data selector 306 selects any one of the values +2A, 0, −2A according to whether the reproduced signal level detected with three levels indicates a value equal to or greater than +A, an intermediate value between +A and −A, or a value equal to or less than −A. A subtracter 307 subtracts the selected data from the input 8-bit data. A comparator 308 compares the difference data with "0", and forms 1-bit data and outputs the 1-bit data to a terminal 309.

If the potentiometer 61 of the AGC circuit 50 is adjusted so that the target amplitude A can be set to "32", the values +2A, 0 and −2A of the detected data become +64, 0 and −64, respectively, and if one of these values is subtracted from the original digital data, the resultant MSB becomes equivalent to the third bit from the MSB of the 8-bit data supplied to the input terminal 300. Accordingly, by performing tracking control using the third bit from the MSB of the output of the AID converter 63, correct tracking control similar to that achievable in the above-described example can be realized with an extremely small-scale circuit construction.

Although an equalizing method capable of holding a low-frequency component, such as PR (1, 1), is particularly effective in performing the aforesaid three-level detection, PR (1, 0, −1), PR (1, −1) or other equalizing methods can also be used to realize tracking control although the S/N ratio is degraded to some extent.

A second embodiment of the present invention will be described below with reference to FIG. 12. FIG. 12 is a block diagram showing the construction of a reproducing system for a digital VTR according to the second embodiment of the present invention. In FIG. 12, identical reference numerals are used to denote constituent elements similar to those shown in FIG. 4, and the detailed description thereof is omitted for clarity.

A reproduced waveform, which has been subjected to integral equalization by the equalizer 51, is applied to the A/D converter 63 via the analog multiplying circuit 53 for AGC, and the A/D converter 63 converts the reproduced waveform into, for example, 8-bit signed digital data. The 8-bit signed digital data is supplied to a phase detector 151, an amplitude detector 161 and the data converting circuit 65.

The phase detector 151 detects a phase difference between the edge of the input waveform and the edge of the clock outputted from a VCO 157 which will be described later, and outputs the detected phase difference to a loop filter 153. The loop filter 153 smooths the detected phase-difference information and applies the result to a D/A converter 155. The output of the D/A converter 155 is applied to the VCO 157, and the VCO 157 generates a clock CLK phase-locked to the input waveform. The output of the VCO 157 is used as the clock CLK for the entire apparatus.

In the meantime, the amplitude detector 161 detects the amplitude of the input integral-equalized waveform, and supplies the detected amplitude to a subtracter 163. The subtracter 163 subtracts the target amplitude value outputted from a register 165 from the amplitude of the integral-equalized waveform, and applies the subtraction output to a loop filter 167. The loop filter 167 smooths the input amplitude difference and supplies the resultant digital data to a D/A converter 169. The D/A converter 169 converts the digital data into an analog form, and applies the analog signal to the analog multiplying circuit 53. Thus, an AGC loop is formed, and a feedback loop works so that the amplitude of the waveform inputted to the A/D converter 63 can be made a target value which is a desired average digital value, for example, "64".

According to the second embodiment, since digital AGC is employed, it is possible to increase a response speed compared to analog AGC and it is also possible to set the aforementioned average digital value to the desired value. Accordingly, the amount of crosstalk of a pilot signal component which is multiplexed with one bit outputted from the data converting circuit 65 becomes highly stable.

In the second embodiment, capstan servo is carried out by a microcomputer. Specifically, the capstan FG outputted from the FG detector (head) 45 is inputted to a servo microcomputer (MPU) 171. The amounts of crosstalk of pilot signal components from both adjacent tracks are compared with each other and subtracted from each other by the subtracter 133. The subtraction result is smoothed by a switch 135 and an LPF 173, and the output of the LPF 173 is supplied to the MPU 171.

The MPU 171 calculates a rotational error of the capstan from the frequency detected by the FG detector 45, adds the rotational error to the tracking error signal outputted from the LPF 173, and outputs a PWM signal having a pulse width proportional to the magnitude of the addition result. The PWM signal is smoothed by an LPF 175, and the output of the LPF 175 is applied to the motor driver 43. Thus, the transport of the magnetic tape 3 is controlled so that the rotary heads HA and HB can correctly trace desired tracks.

In the above-described embodiment of FIG. 12, since the ATF circuit is digitized, an ATF control signal can be supplied to the servo microcomputer as digital data. Accordingly, it is possible to simplify the circuit construction to a further extent.

Figure 2:
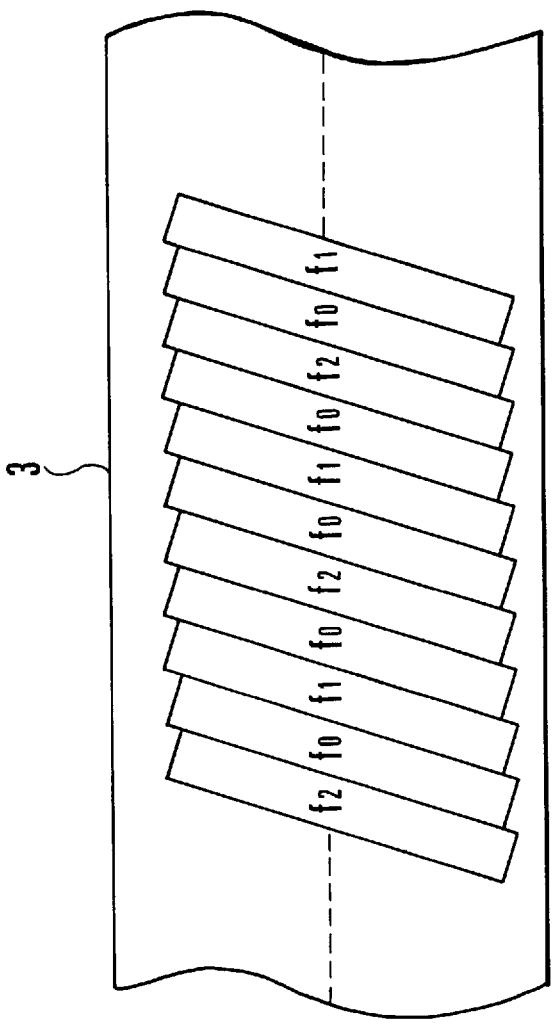
FIG. 2 is a schematic view showing one example of a recording pattern formed on a magnetic tape.
Figure 3:
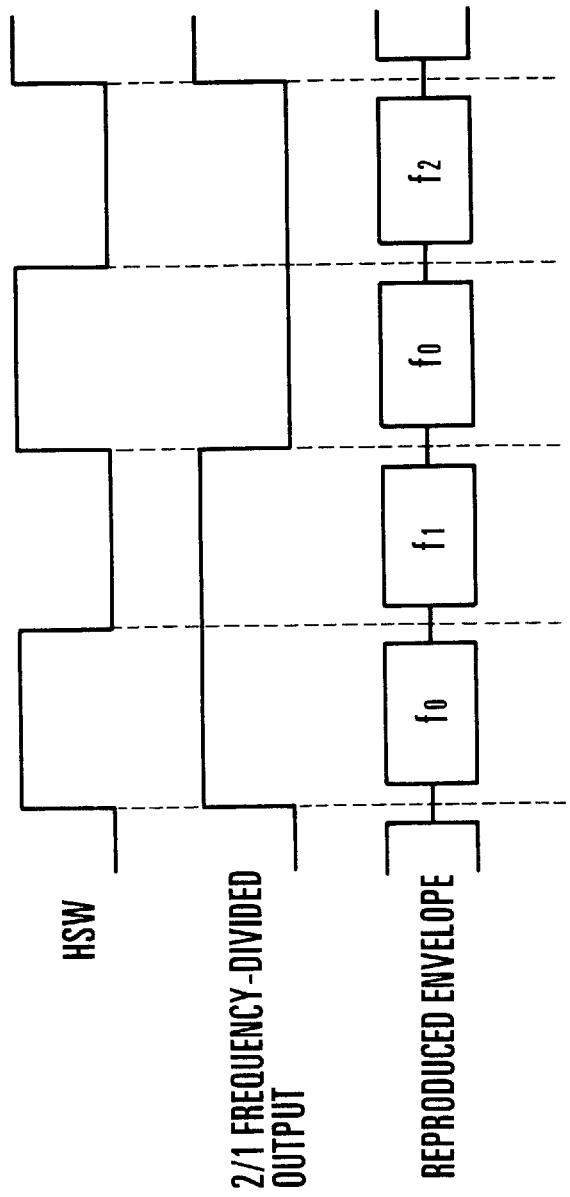
FIG. 3 is a timing chart showing waveforms which are obtained at essential locations in the circuit shown in FIG. 1.

The above embodiments have been described with reference to the digital VTRs which are arranged to reproduce a digital signal recorded on magnetic tape as shown in FIG. 2. However, the present invention is not limited to either of the above-described tracking control methods. If the present invention is applied to an apparatus which is arranged to multiplex a pilot signal component with a digital signal and extract the pilot signal component, the circuit scale of such an apparatus can similarly be reduced to a great extent.

As is apparent from the foregoing description, according to each of the above-described embodiments, there is provided a digital signal reproducing apparatus which is arranged to reproduce a signal indicative of digital information from a recording medium and form binary data indicative of a magnitude of an actual reproduced signal relative to a plurality of predetermined values indicative of a plurality of amplitude values to be taken by the signal reproduced from the recording medium, thereby efficiently detecting a pilot signal component multiplexed with the reproduced signal, on the basis of the binary data. Accordingly, since the detection of the pilot signal component can be realized by a binary data processing circuit, the circuit scale of the apparatus can be made remarkably small.

What is claimed is:

1. A digital signal reproducing apparatus comprising:
reproducing means for reproducing from a recording medium a signal recorded by digital modulation of a pilot signal component with digital data;
converting means for converting a signal reproduced by said reproducing means into a digital amplitude value represented by a plurality of bits;
forming means for forming binary data, each of a binary level of the binary data being indicative of the digital amplitude value relative to a plurality of predetermined amplitude values; and
detecting means for detecting the pilot signal component of said reproduced signal on the basis of the binary data.

2. A digital signal reproducing apparatus according to claim 1, wherein said forming means includes extracting means for extracting a most significant bit of a digital signal indicative of a difference between the digital amplitude value and one of the plurality of predetermined amplitude values.

3. A digital signal reproducing apparatus according to claim 2, wherein each of the plurality of predetermined amplitude values is a power of 2.

4. A digital signal reproducing apparatus according to claim 2, wherein each of the plurality of predetermined amplitude values is a value corresponding to a most significant bit of the digital amplitude value, said extracting means extracting a second bit of the digital amplitude value adjacent said most significant bit.

5. A digital signal reproducing apparatus according to claim 1, further comprising an automatic gain control circuit for controlling an amplitude of the reproduced signal so that the reproduced signal exhibits the plurality of amplitude values.

6. A digital signal reproducing apparatus according to claim 5, wherein said automatic gain control circuit detects the amplitude of the reproduced signal from the digital amplitude value and controls according to the detected amplitude the amplitude of the reproduced signal inputted to said converting means.

7. A digital signal reproducing apparatus according to claim 1, further comprising a phase-locked loop circuit for generating a clock signal phase-locked to the reproduced signal.

8. A digital signal reproducing apparatus according to claim 7, wherein said phase-locked loop circuit detects phase information of the reproduced signal by using the digital amplitude value and forming according to the detected phase information a clock signal for driving said converting means.

9. A digital signal reproducing apparatus according to claim 1, further comprising control means for controlling a relative position between the recording medium and said reproducing means by using the pilot signal component detected by said detecting means.

10. A digital signal reproducing apparatus according to claim 1, wherein said reproducing means includes a rotary head for sequentially tracing tracks formed in parallel on the recording medium, said detecting means detecting pilot signal components from both tracks adjacent to a track which is being traced by said rotary head and making comparison between the pilot signal components.

11. A digital signal reproducing apparatus according to claim 1, wherein said detecting means includes means for subsampling the binary data processed through a prefilter, said detecting means detecting the pilot signal component from the subsampled binary data.

12. A digital signal reproducing apparatus comprising:
reproducing means for reproducing from a recording medium a signal recorded by digital modulation of a pilot signal component with digital data;
converting means for converting a signal reproduced by said reproducing means into a digital amplitude value represented by a plurality of bits;
amplitude controlling means for controlling an amplitude of a reproduced signal supplied from said reproducing means;
forming means for forming binary data, each of a binary level of the binary data being indicative of the digital amplitude value relative to a target amplitude value for said amplitude controlling means; and
detecting means for detecting said pilot signal of said reproduced signal on the basis of the binary data.

13. A digital signal reproducing apparatus comprising:
reproducing means for reproducing from a recording medium a signal recorded by digital modulation of a pilot signal component with digital data;
converting means for converting a signal reproduced by said reproducing means into a digital amplitude value represented by a plurality of bits;
extracting means for extracting a predetermined bit from the plurality of bits outputted from said converting means; and
detecting means for detecting said pilot signal component of said reproduced signal by using data relative to the predetermined bit extracted by said extracting means.

14. An apparatus according to claim 13, wherein said predetermined bit is a bit from the plurality of bits which is adjacent a most significant bit therein.

15. An apparatus according to claim 13, further comprising tracking control means for controlling a relative position between said reproducing means and the recording medium by using the pilot signal component detected by said detecting means.

16. A digital signal reproducing method comprising the steps of:
reproducing from a recording medium a signal recorded by digital modulation of a pilot signal component with digital data;
converting a signal reproduced in said reproducing step into a digital amplitude value represented by a plurality of bits;
forming binary data, each of a binary level of the binary data being indicative of the digital amplitude value relative to a plurality of predetermined amplitude values; and
detecting said pilot signal component of said reproduced signal on the basis of the binary data.

17. A digital signal reproducing method comprising the steps of:
reproducing from a recording medium a signal recorded by digital modulation of a pilot signal component with digital data;

converting a signal reproduced in said reproducing step into a digital amplitude value represented by a plurality of bits;

controlling the reproduced signal so that an amplitude of the reproduced signal can be made constant;

forming binary data, each of a binary level of the binary data being indicative of the digital amplitude value relative to an amplitude control target; and detecting the pilot signal component of said reproduced signal on the basis of the binary data.

18. A digital signal reproducing method comprising the steps of:

reproducing from a recording medium a signal recorded by digital modulation of a pilot signal component with digital data;

forming plural-bit data indicative of an amplitude of a signal reproduced in said reproducing step;

extracting a predetermined bit from the plural-bit data; and detecting the pilot signal component of said reproduced signal on the basis of the extracted predetermined bit.

19. A digital signal reproducing method comprising the steps of:

reproducing from a recording medium a signal recorded by digital modulation of a pilot signal component with digital data;

forming plural-bit data indicative of an amplitude of a signal reproduced in said reproducing step;

forming binary data, each of a binary level of the binary data being indicative of the plural-bit data relative to a predetermined value; and detecting the pilot signal component of said reproduced signal on the basis of the binary data.

20. A digital signal reproducing apparatus comprising:

reproducing means for reproducing from a recording medium a signal recorded by digital modulation of a pilot signal component with digital data;

means for forming binary data, each of a binary level of the binary data being indicative of an amplitude of the reproduced signal;

means for forming binary data indicative of the plural-bit data relative to a predetermined value; and detecting means for detecting the pilot signal component of said reproduced signal on the basis of the binary data.

21. A digital signal reproducing apparatus, comprising reproducing means for reproducing from a recording medium a signal recorded by digital modulation of a pilot signal component with digital data;

conversion means for converting a signal reproduced by said reproducing means into a digital amplitude value represented by a plurality of bits;

forming means for forming digital data composed of a series of one bit data representing a condition of an amplitude of the reproduced signal, the one bit data being formed through the plurality of bits of the digital amplitude value; and detecting means for detecting the pilot signal component of the reproduced signal on the basis of the series of one bit data.

22. A digital signal reproducing method, comprising the steps of:

reproducing from a recording medium a signal recorded by digital modulation of a pilot signal component with digital data;

converting a signal reproduced in said reproducing step into a digital amplitude value represented by a plurality of bits;

forming digital data composed of a series of one bit data representing a condition of an amplitude of the reproduced signal, the one bit data being formed through the plurality of bits of the digital amplitude value; and detecting the pilot signal component of the reproduced signal on the basis of the series of one bit data.

* * * * *